| United States Patent [19] | [11] 4,016,134 |
|---|---|
| Machi et al. | [45] Apr. 5, 1977 |

[54] NOVEL COMPOSITE COMPRISING A SPECIAL GRAFT-COPOLYMER

[75] Inventors: Sueo Machi, Takasaki; Taiji Aono, Ichihara; Yasushi Matui, Satte; Yoshiharu Hibi; Takayuki Shinano, both of Yokohama, all of Japan

[73] Assignees: Japan Atomic Energy Research Institute, Tokyo; Maruzen Oil Co., Ltd., Osaka; Mitsuhashi Kakoki Kaisha Ltd., Tokyo, all of Japan

[22] Filed: Jan. 8, 1975

[21] Appl. No.: 539,589

Related U.S. Application Data

[63] Continuation of Ser. No. 375,880, July 2, 1973, abandoned.

[30] Foreign Application Priority Data

July 3, 1972 Japan .............................. 47-66437
Sept. 5, 1972 Japan .............................. 47-88337

[52] U.S. Cl. .......................... 260/42.24; 260/42.46
[51] Int. Cl.² ......................................... C08K 3/30
[58] Field of Search ..................... 260/42.24, 42.46

[56] References Cited

UNITED STATES PATENTS

| 3,437,550 | 4/1969 | Paul ................................ 260/42.18 |
| 3,553,302 | 1/1971 | Susuki et al. ...................... 264/211 |
| 3,650,814 | 3/1972 | Elder ............................... 260/42.18 |
| 3,687,890 | 8/1972 | Susuki et al. ................... 260/42.24 |
| 3,711,438 | 1/1973 | Susuki et al. ................... 260/42.24 |

FOREIGN PATENTS OR APPLICATIONS

| 721,461 | 3/1973 | Netherlands |
| 1,095,700 | 12/1967 | United Kingdom ............ 260/42.46 |

OTHER PUBLICATIONS

Derwent Pub. Ltd., 19072U87, Abstract of Netherlands Application 7,212,461.

*Primary Examiner*—James H. Derrington
*Attorney, Agent, or Firm*—Browdy and Neimark

[57] ABSTRACT

A novel composite with improved mechanical properties is obtained by blending a gypsum and/or calcium sulfite with a polyolefin onto which acrylic acid was graft-polymerized.

A polyolefin which is not graft-polymerized can optionally be blended in the composite.

4 Claims, No Drawings

NOVEL COMPOSITE COMPRISING A SPECIAL GRAFT-COPOLYMER

This is a continuation of application Ser. No. 375,880, filed July 2, 1973, now abandoned.

The present invention relates to a novel composite comprising (1) polyolefin resin and (2) gypsum and/or calcium sulfite. More particularly, this invention relates to a novel composite comprising (1) acrylic acid-grafted polyolefin and (2) gypsum and/or calcium sulfite, and optionally (3) non-grafted polyolefin. The term "polyolefin" as used herein represents homopolymers obtained from ethylenycally unsaturated hydrocarbons having from two to five carbon atoms, such as polyethylene, polypropylene, polybutene, polyisobutylene, polypentene; or copolymers obtained from any two or more of said unsaturated hydrocarbons, such as ethylene-propylene copolymer; or mixtures of any two or more of said homopolymers and/or copolymers. However, polyethylene, polypropylene and the mixture thereof are the most preferred.

It is known to obtain a composite having flame retarding characteristics and small calorific value, by mechanically blending gypsum or calcium sulfite with polyolefin. But this process has a disadvantage in that polyolefin shows poor affinity for gypsum and calcium sulfite because polyolefin is hydrophobic and nonpolar. The present inventors have done research to eliminate the above disadvantage, working on the assumption that the affinity mentioned above can be increased by giving hydrophilic property to polyolefin, and they found that the affinity is considerably increased by graft-polymerizing a small amount of acrylic acid on polyolefin, and that the resulting composite has mechanical strength superior to that produced by the prior processes. Moreover, it has been also found that it is not necessary to change all of the polyolefin used to graft-copolymer containing acrylic acid, that is, the affinity can be similarly increased by blending a small amount of graft-copolymer of polyolefin with acrylic acid in a matrix of polyolefin. Thus, there is provided a very important composite having excellent mechanical strength suitable for practical use such as construction.

The polyolefin graft-polymerized with acrylic acid to be used in the present invention is obtained by initiating the graft-polymerization by using an ionizing radiation, an ultraviolet light or the like physical means, by using a radical initiator or the like chemical means. An ionizing radiation or an ultraviolet light can be applied by means of preirradiation and/or simultaneous irradiation. The former is superior to the latter for the purpose of suppressing the formation of homopolymer of acrylic acid and to enhance graft-efficiency. The preirradiation is carried out in vacuum or in air; carrying it out in air is more convenient for industrial operation. When carried out in air, the polyolefin is irradiated at room temperature, then is graft-polymerized by contacting it with acrylic acid. The acrylic acid can be applied in liquid or vapor phase, but the vapor phase method is preferable because it eliminates the need for after-treatment of polyolefin and has high graft-efficiency.

In the present invention, there are two ways of employing said graft-copolymer. One is that only such graft-copolymer is used for blending with gypsum and/or calcium sulfite to make a composite from the blend. In this case, it is preferable that the percent graft (the ratio of weight increase after the graft-polymerization) be in the range of from about 0.05% to about 10%. When the ratio is higher, the water-resistance of the composite obtained may sometimes be decreased. According to another method, part of polyolefin is replaced with said graft-copolymer and the mixture of polyolefin and graft-copolymer is blended with gypsum and/or calcium sulfite. In this case, although the percent graft of the graft-copolymer is not especially restricted, it is preferable to regulate the ratio of the amount of acrylic acid present as graft in the said graft-copolymer to the amount of the mixture mentioned above to the range of from about 0.1 to about 10% by weight.

Therefore, it is possible, for instance, to employ a mixture in which the ratio of acrylic acid to the total amount of mixture is adjusted to become 0.5% by blending 1 part by weight of graft-copolymer containing 10% of acrylic acid as graft with 19 parts by weight of untreated polyolefin which has no graft, before making a composite from the mixture by blending it with gypsum, etc.

The blending ratio of the amount polyolefin which is graft-copolymerized with acrylic acid or the mixture of this graft-copolymer and untreated polyolefin to the amount of gypsum and/or calcium sulfite is usually in the range of from about 0.1 : 0.9 to about 0.5 : 0.5 and each component of the mixture is usually melted and kneaded at the temperature above the melting point of polyolefin, preferably from about 160° C to about 230° C, then the molten mixture is molded. Moreover, in the present invention, proper amounts of pigment, filler and/or other additives can optionally be added, within a range such that they do not substantially impair the mechanical properties.

Examples of the present invention are described hereinafter, but the invention should not be restricted by these examples.

EXAMPLE 1

High density polyethylene powder having an average particle size of 60 $\mu$ dia. was irradiated with an electron beam in air for a total dose of $3 \times 10^6$ rad. at room temperature, then the powder was loaded in an H-shaped glass cell. After the cell was evacuated, the polyethylene was treated to produce graft-copolymer by contacting it with the vapor of acrylic acid at 60° C for 3 hours. The time duration from the above irradiation to the initiation of the graft-polymerization was 20 minutes.

The percent graft of the obtained copolymer calculated from the weight increase of the initial polymer after the graft-copolymerization was 4.3%. 70 parts by weight of calcium sulfite was mixed with 30 parts by weight of said graft-copolymer and the mixture was kneaded at 180° C for 15 minutes by using a roller-mixer manufactured by Brabender Inc. Then, the mixture was pressed under applied pressure of 150 kg/cm² at 180° C using a hot press machine to form a sheet 1 mm thick. A JIS No. 3 type test piece of dumbbell shape was cut out from the sheet. The tensil strength of this test piece was measured using a tension testor. For comparison, another test piece similar to the above was prepared from a composite comprising polyethylene (not grafted) and calcium sulfite. The tensile strength of the test piece was also measured in the same way as mentioned above. The results are shown in Table 1 below.

| Polyethylene | Percent graft (wt %) | Tensile strength(kg/cm$^2$) | |
|---|---|---|---|
| | | 100% polyethylene | 30% polyethylene 70% calcium sulfite |
| untreated | 0 | 197 | 161 |
| graft-copolymerized | 4.3 | 194 | 283 |

As is obvious from Table 1 above, the composite prepared from graft-copolymer of polyethylene and acrylic acid shows considerably higher tensile strength than the composite obtained from untreated polyethylene. Considering that there is no significant difference between the tensile strength of grafted and non-grafted polyethylene, the superiority in tensile strength of the present new composite is considered to be due to the excellent affinity of graftcopolymer for calcium sulfite.

EXAMPLE 2

Graft-copolymerization was carried out for 1.5 hours at 60° C by the procedures similar to those in Example 1. The percent graft of formed copolymer was 0.1%. 30 parts by weight of the resultant graft-polyethylene was mixed with 70 parts by weight of calcium sulfite and the mixture was kneaded in the same way as in Example 1. According to the process as in Example 1, the mixture was pressed and a test piece was cut out, and then the tensile strength was measured. The tensile strength of the composite consisting of 30% by weight graft-polymerized polyethylene and 70% by weight calcium sulfite was 249 kg/cm$^2$. The tensile strength of the composite was considerably increased by employing polyethylene which is graft-polymerized with very small amount of acrylic acid, in comparison with the value of 161 kg/cm$^2$, the value of the composite prepared using untreated polyethylene.

EXAMPLE 3

Graft-copolymerization was carried out by a process similar to that as in Example 1, to obtain a product having the percent graft of 0.75%. A composite consisting of 30% by weight of graft-polymerized polyethylene and 70% by weight calcium sulfite was prepared in the same process as in Example 1, and then the tension test was carried out. The tensile strength was 262 kg/cm$^2$, which is higher than the value obtained in Example 2.

EXAMPLE 4

Graft-copolymerization was carried out by a process similar to that in Example 1, except that the reaction temperature was 80° C and the reaction period was 4 hours. The percent graft was 10.5%. The tension test was carried out on a composite prepared by mixing 30% by weight of the graft-polymerized polyethylene with 70% by weight of gypsum. The tensile strength was 277 kg/cm$^2$ and that of the comparative composite consisting of untreated polyethylene and 70% gypsum was 160 kg/cm$^2$. It was confirmed from the above fact that the tensile strength of the present composite is also markedly increased when gypsum is used instead of calcium sulfite.

EXAMPLE 5

Polyethylene was graft-polymerized with acrylic acid by the same process as in Example 1. Several kinds of samples were prepared by blending the graft-copolymer with untreated high density polyethylene in various ratios. 30% of each of these samples was mixed with 70% of calcium sulfite and the mixture was melted and kneaded respectively in a process similar to that in Example 1. Test pieces were cut out from each sheet prepared from the above mixtures, and the tension tests were carried out. Incidentally, the blending ratios in weight of the graft-copolymer to untreated polyethylene were set at 66.6, 50, 16.6 and 6.6, respectively. The results are shown in Table 2 below.

Table 2

| Tensile strength are given below as to the various samples of polyethylene composite. | | | | | | |
|---|---|---|---|---|---|---|
| Blending ratio of graft-copolymer (weight %) | 100 | 66.6 | 50 | 16.6 | 6.6 | 0 |
| Tensile strength (kg/cm$^2$) | 283 | 286 | 267 | 254 | 237 | 161 |

As is clearly shown in Table 2, the tensile strength of the composite in question is considerably improved even by using only about 7% of the graft-copolymer in the mixture of grafted and non-grafted polyethylene.

EXAMPLE 6

Several samples were prepared by blending the graft-copolymer obtained in the same process as that in Example 4 with untreated polyethylene in various weight ratios. Each sample was mixed with gypsum and kneaded with a Brabender type roller-mixer. Test pieces were cut out from each of the above samples and the tension test was carried out. The weight ratios in blending of the graft-copolymer to untreated polyethylene were set at 10, 6.6, 5 and 3.3%, respectively. The results are listed in Table 3 below.

Table 3

| Tensile strengths are given below with respect to the polyethylene composite improved by blending polyethylene which was graft-polymerized with acrylic acid. | | | | | | |
|---|---|---|---|---|---|---|
| Blending ratio of graft-copolymer (weight %) | 100 | 10 | 6.6 | 5 | 3.3 | 0 |
| Tensile strength (kg/cm$^2$) | 277 | 254 | 257 | 247 | 234 | 160 |

As shown in Table 3, a higher percent graft of the graft-copolymer results in improvement of the tensile strength, by employing the lower blending ratio of the graft-copolymer.

EXAMPLE 7

Polypropylene powder was irradiated in air at room temperature with an electron beam for a total dose 3 × 10$^6$ rad, and the powder was loaded in an H-shaped glass ampoule. After the ampoule was evacuated, the polypropylene was graftcopolymerized by contacting it with the vapor of acrylic acid at 80° C for 2 hours.

The period of time from the above irradiation to the initiation of the graft-polymerization was 20 minutes. The percent graft calculated from the weight increase of the obtained copolymer was 7.0%. 70 parts by weight of calcium sulfite was mixed with 30 parts by weight of the above polypropylene which was graft-copolymerized with acrylic acid, and the mixture was kneaded using a rollermixer manufactured by Brabender Inc. at 180° C for 15 minutes. Then, the mixture was pressed with the pressure of 150 kg/cm² at 180° C using a hot press machine to form a sheet 1 mm thick. A JIS No. 3 type test piece in the dumb-bell shape was cut out from the above sheet and its tensile strength was measured by using a tension tester. For comparison, a test piece similar to the above was prepared from a composite consisting of non-graftcopolymerized polypropylene and calcium sulfite, and the tensile strength was measured in the same way as above. The results are shown in Table 4 below.

Table 4

| | Tensile strengths of polypropylene composites (tension speed: 5 mm/min) | |
|---|---|---|
| Polypropylene | Percent graft (weight %) | Tensile strength of the composite consisting of 70% calcium sulfite plus 30% polypropylene |
| untreated | 0 | 148 |
| graft-copolymerized | 7.0 | 192 |

As is clearly shown in Table 4, the composite prepared using polypropylene which is graft-copolymerized with acrylic acid has markedly higher tensile strength than that prepared using untreated polypropylene.

EXAMPLE 8

200 g of polypropylene in pellet form was irradiated with an electron beam for a total dose $3 \times 10^6$ rad in air at room temperature; then the pellets were loaded in a separable flask. About 250 ml of n-hexane, in which 5 g of acrylic acid was dissolved, was added to the flask, and atmosphere in the flask was replaced with nitrogen at low temperature for 10 minutes. Subsequently, graft-polymerization was carried out for 4 hours in water bath at 60° C. The percent graft was 2.5%. 30 parts by weight of resulting polypropylene which was graft-polymerized with acrylic acid was mixed with 70 parts by weight of calcium sulfite, kneaded with a rollermixer and pressed to form a sheet 1 mm thick as in Example 7. A test piece was cut out from the sheet and then tension tests were carried out. The results are listed in Table 5.

Table 5

| | Tensile strengths of the propylene composites | | |
|---|---|---|---|
| Polypropylene | Percent graft (weight %) | Tensile strength | |
| | | Polypropylene (100%) | Polypropylene: 30% Calcium sulfite: 70% |
| untreated | 0 | 270 | 153 |
| graft-copolymerized | 2.5 | 275 | 232 |

Table 5 shows that the tensile strength of the composite prepared from untreated polypropylene is much lower than that of the polypropylene used as starting material. In contrast, the tensile strength of the composite prepared from graft-copolymerized polypropylene is markedly improved owing to increase in the affinity between said graftcopolymer and calcium sulfite, in comparison with that of the composite comprising non-graft-polymerized polypropylene.

EXAMPLE 9

70 parts by weight of gypsum was mixed with 30 parts by weight of graft-copolymerized polypropylene prepared by the same process as in Example 8, and tensile strength of a test piece prepared from the composite was measured. The tensile strength was 275 kg/cm². This value is considerably higher than that of a composite (160 kg/cm²) consisting of untreated polypropylene and gypsum.

EXAMPLE 10

Untreated polypropylene was mixed with graft-copolymerized polypropylene prepared by the same process as in Example 8. 30 parts by weight of the above mixture was further mixed with 70 parts by weight of gypsum and kneaded. A test piece was cut out from a sheet prepared from the mixture and the tensile strength was measured. The weight ratio of the graft-copolymerized polypropylene to untreated polypropylene in the mixture of them was set at 20 or 10%. The results are listed in Table 6 below.

Table 6

| | Tensile strength of the polypropylene | | | |
|---|---|---|---|---|
| Blending ratio of graft-copolymer (weight %) | 100 | 20 | 10 | 0 |
| Tensile strength (kg/cm²) | 275 | 225 | 200 | 160 |

As is obvious from Table 6 above, the tensile strength of the composite was considerably improved even when only 10% of graft-copolymer was used in the mixture.

What is claimed is:

1. A composite consisting essentially of (1) from about 10 to about 50 parts by weight of a graft-copolymer prepared by graft-copolymerizing acrylic acid monomer on polyolefin and (2) from about 90 to 50 parts by weight of gypsum and/or calcium sulfite, the percent graft in said graft-copolymer being in the range of from about 0.05 to about 10% based on the total weight of the graft-polymer.

2. A composite in accordance with claim 1 wherein said polyolefin is selected from the group consisting of polyethylene, polypropylene and a mixture thereof.

3. A composite consisting essentially of (1) from about 10 to about 50 parts by weight of a mixture comprising (a) a graft-copolymer prepared by graft-copolymerizing acrylic acid monomer on polyolefin and (b) polyolefin; and (2) from about 90 to 50 parts by weight of gypsum and/or calcium sulfite, the percent acrylic acid present as a grafted chain in the graft-copolymer based on the total weight of the mixture of the graft-copolymer and the polyolefin being in the range of from about 0.1 to about 10%.

4. A composite in accordance with claim 3 wherein said polyolefin is selected from the group consisting of polyethylene, polypropylene and a mixture thereof.

* * * * *